(12) United States Patent
Balding

(10) Patent No.: US 10,190,450 B2
(45) Date of Patent: Jan. 29, 2019

(54) CAMSHAFT DEACTIVATION SYSTEM FOR AN INTERNAL COMBUSTION ENGINE

(71) Applicant: GM Global Technology Operations LLC, Detroit, MI (US)

(72) Inventor: Andrew G. Balding, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 15/378,564

(22) Filed: Dec. 14, 2016

(65) Prior Publication Data
US 2018/0163581 A1    Jun. 14, 2018

(51) Int. Cl.
| | |
|---|---|
| F01L 13/00 | (2006.01) |
| F16H 1/28 | (2006.01) |
| F01L 1/02 | (2006.01) |
| F01L 1/047 | (2006.01) |
| F16H 37/02 | (2006.01) |
| F01L 1/352 | (2006.01) |

(52) U.S. Cl.
CPC .......... *F01L 13/0005* (2013.01); *F01L 1/026* (2013.01); *F01L 1/047* (2013.01); *F01L 1/352* (2013.01); *F01L 13/00* (2013.01); *F16H 1/28* (2013.01); *F16H 37/02* (2013.01); *F01L 2013/001* (2013.01); *F01L 2820/032* (2013.01)

(58) Field of Classification Search
CPC ....... F01L 13/0005; F01L 1/026; F01L 1/047; F01L 2013/001; F01L 1/352; F01L 2820/032; F16H 1/28; F16H 37/02
See application file for complete search history.

(56) References Cited

U.S. PATENT DOCUMENTS

| | | | | |
|---|---|---|---|---|
| 4,583,501 A | * | 4/1986 | Williams | F01L 1/12 123/90.15 |
| 4,747,375 A | * | 5/1988 | Williams | F01L 1/12 123/90.15 |
| 5,305,719 A | * | 4/1994 | Clarke | F01L 1/02 123/198 F |
| 5,680,837 A | * | 10/1997 | Pierik | F01L 1/352 123/90.17 |
| 6,129,061 A | * | 10/2000 | Okuda | F01L 1/352 123/90.17 |
| 6,915,775 B2 | | 7/2005 | Patterson et al. | |
| 2006/0027197 A1 | * | 2/2006 | Tagami | F01L 1/022 123/90.17 |
| 2015/0315939 A1 | * | 11/2015 | Showalter | F01L 1/352 123/90.17 |

* cited by examiner

*Primary Examiner* — Mark A Laurenzi
*Assistant Examiner* — Wesley G Harris
(74) *Attorney, Agent, or Firm* — Harness, Dickey & Pierce, P.L.C.

(57) ABSTRACT

A camshaft drive system for an internal combustion engine, includes a camshaft including a plurality of cam lobes thereon. A planetary gear system including a first component drivingly connected to the camshaft. A motor is drivingly connected to a second component of the planetary gear system and a sprocket is driven by the internal combustion engine and drivingly connected to a third component of the planetary gear system. A controller controls operation of the motor for selectively driving the second component at a same speed as the third component for imparting rotation to the camshaft and for selectively preventing rotation of the second component of the planetary gear system for preventing rotation of the camshaft.

12 Claims, 1 Drawing Sheet

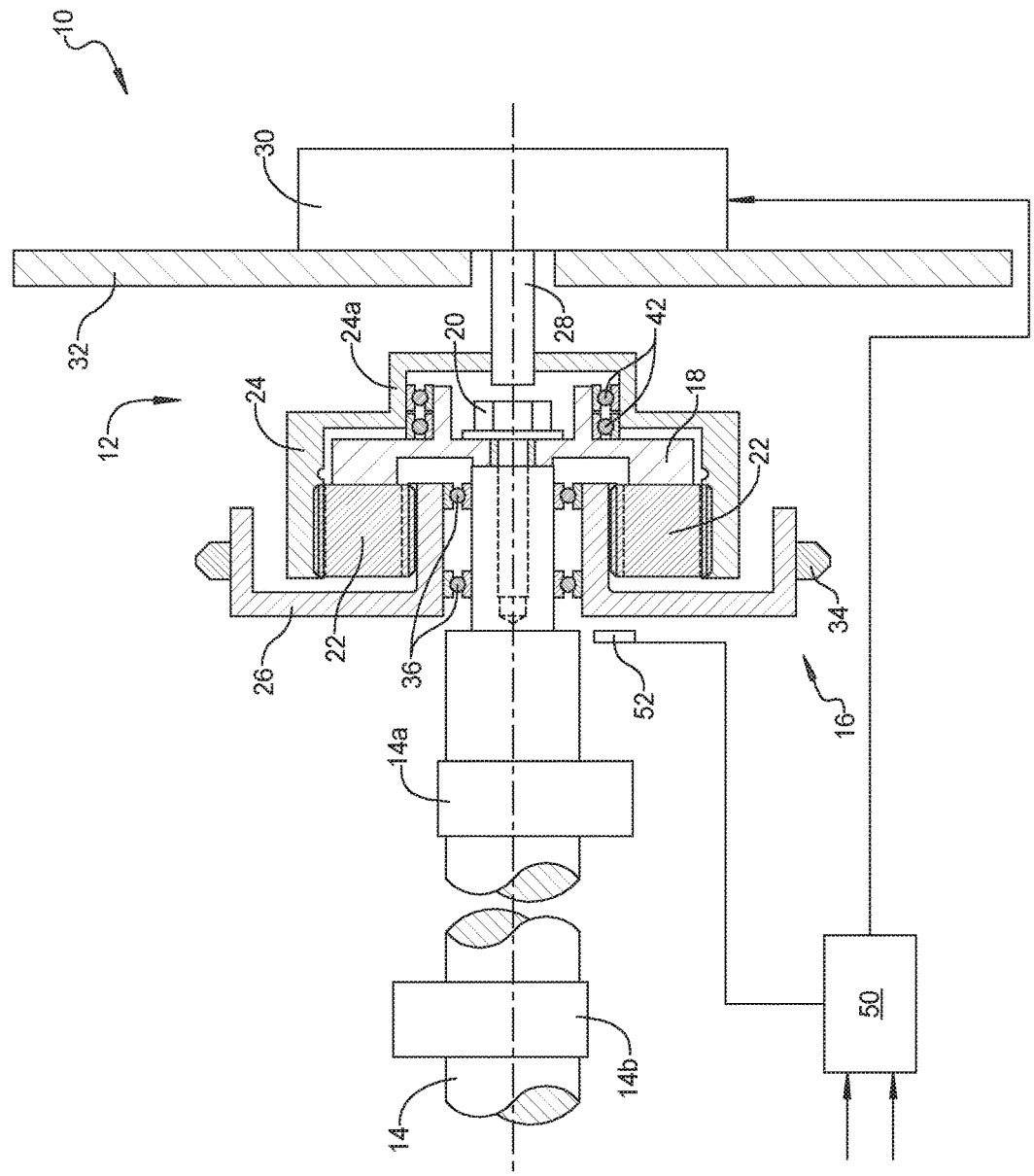

CAMSHAFT DEACTIVATION SYSTEM FOR AN INTERNAL COMBUSTION ENGINE

FIELD

The present disclosure relates to a camshaft deactivation system for an internal combustion engine to allow deactivation of a valve train during cylinder deactivation.

BACKGROUND

This section provides background information related to the present disclosure which is not necessarily prior art.

Engine systems are currently being used which include cylinders which can be deactivated under low loads for improving the fuel economy of the engine. In these cylinder deactivated systems, the camshafts and valvetrain systems are still operable. Rotating camshafts and valve train systems contain inherent friction as a side effect of their provided function. Minimizing this fiction as much as possible results in improved fuel economy. Through deactivation of the camshaft associated with the deactivated cylinders when not required, fuel economy can be further enhanced.

SUMMARY

This section provides a general summary of the disclosure, and is not a comprehensive disclosure of its full scope or all of its features.

The present disclosure utilizes a planetary gearset configured with the sun gear being driven by a conventional chain drive. A planetary carrier is attached rigidly to the rotatable camshaft, and the ring gear is selectively connected to a an electric motor. The system permits multiple operating modes to be delivered including decoupling of the camshaft rotation from the chain drive completely so that the camshaft rotation is stopped. The system also allows normal camshaft operation at one half engine speed rotation (for a four stroke engine configuration) and also allows the phase relationship between the camshaft and the chain drive to be synchronized for proper cam phasing with the combustion cycle. Further, it is possible to drive the camshaft at varying crankshaft coupling ratios so that mixed strategies could be employed (e.g. 4-stroke/2-stroke switching).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The FIGURE is a schematic view of a camshaft deactivation system for an internal combustion engine according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGURES. Spatially relative terms may be intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the FIGURE, the present disclosure is directed to an internal combustion engine 10 that includes a camshaft deactivation system 12. The camshaft deactivation system 12 includes a camshaft 14 that engages a valve train of the engine 10, as is known in the art. A planetary gear system 16 is provided for selectively deactivating and activating the camshaft 14 for rotation with the engine 10. In particular, as shown in the FIGURE, the planetary gear system 16 includes a planetary carrier 18 that is secured to the nose 14a of the camshaft 14 by a mounting bolt 20. The planetary carrier 18 rotatably supports a plurality of planetary gears 22 in meshing engagement with a ring gear 24 and a sun gear 26 of the planetary gear system 16. The ring gear 24 is drivingly connected to a drive shaft 28 of an electric motor 30 which can be mounted to a front cover 32 of the internal combustion engine 10. The motor 30 can be a compact designed pancake motor that has a thin axial dimension. The sun gear 26 is connected to a sprocket 34 which can be driven by a chain drive system that is connected to a crankshaft of the internal combustion engine 10, as is known in the art. Although a sprocket 34 and chain drive system is shown, it should be understood that a belt and pulley drive system can be utilized as an alternative input device.

The sun gear 26 can be rotatably supported on the nose end 14a camshaft 14 by one or more bearings sets 36. The sun gear 26 and sprocket 34 can be integrally formed with the sprocket 34 being disposed directly radially outward from the sun gear 26 so that the integral sun gear 26 and sprocket 34 form a C-shaped half cross-section.

The camshaft 14 includes a plurality of cam lobes 14b for engagement with the valve train of the internal combustion engine 10, as is well known in the art.

The planetary carrier 18 includes an axially extending annular journal 40 on which a hub portion 24a of the ring gear 24 is rotatably supported by one or more bearings sets 42.

An engine control unit or other controller 50 can be provided for controlling operation of the camshaft deactivation system 12. In particular, the controller 50 can control operation of the electric motor 30 in one of 5 operating modes. In particular, the camshaft deactivation system 12 can decouple the camshaft rotation from the chain drive completely so that the camshaft rotation is stopped. This can be achieved by allowing the electric motor 30, to freewheel, or if necessary to be electrically driven, at a proportional speed equivalent to the ratio between sun and ring gears. The electric motor 30 can also be driven at a speed equal to a rotational speed of the sprocket 34 and sun gear 26 to effectively lock up the planetary gearset 16 to drive the camshaft 14 at one half the engine speed based upon the reduction ratio of the sprocket and chain drive system. The electric motor 30 can also be operated to bring the rotational position of the camshaft 14 into phase with the combustion cycle of the internal combustion engine 10. Additionally, the electric motor 30 can be held (stopped) allowing the camshaft 14 to rotate by way of the planetary carrier 18 at a ratio dependent upon the specific ratio relationship between ring gear 24, and sun gear 26. Finally the electric motor 30, can be accelerated to enable higher ratios between crankshaft and camshaft to be delivered if desired. The control of the motor 30 can be controlled by the controller 50 based upon a camshaft position sensor 52 and other engine control parameters. Once the camshaft and valve operation is brought into phase, the operation of the deactivated cylinders can be commenced by fuel injection and spark ignition via the engine control unit or other controller 50. The engine control unit or other controller 50 can include various control modules that receive and send numerous control related signals relating to the engine and vehicle operation.

The present disclosure provides a system to deactivate the valves of the engine valve train while the engine is being operated with deactivated cylinders. The present system enables full valvetrain deactivation through total deactivation of the driven camshaft to minimize the friction as much as possible for improved fuel economy. The system of the present application enables valve deactivation to be achieved at high engine speeds that exceed 3500 RPM while existing technologies have limited functional deactivation below 3500 RPM due to mechanical limits.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A camshaft drive system for an internal combustion engine, comprising:
    a camshaft including a plurality of cam lobes thereon;
    a planetary gear system including a first component drivingly connected to said camshaft;
    a motor drivingly connected to a second component of the planetary gear system; and
    an input device driven by the internal combustion engine and drivingly connected to a third component of the planetary gear system; and
    a controller for controlling operation of the motor for selectively driving the second component at a same speed as the third component and for selectively preventing rotation of the first component of the planetary gear system for preventing rotation of the camshaft
    wherein the second component of the planetary gear system is a ring gear.

2. The camshaft system according to claim 1, wherein the first component of the planetary gear system is a planetary carrier.

3. The camshaft drive system according to claim 1, wherein the input device includes a sprocket.

4. A camshaft drive system for an internal combustion engine, comprising:
    a camshaft including a plurality of cam lobes thereon;
    a planetary gear system including a first component drivingly connected to said camshaft;
    a motor drivingly connected to a second component of the planetary gear system; and
    an input device driven by the internal combustion engine and drivingly connected to a third component of the planetary gear system; and
    a controller for controlling operation of the motor for selectively driving the second component at a same speed as the third component and for selectively preventing rotation of the first component of the planetary gear system for preventing rotation of the camshaft wherein the third component of the planetary gear system is a sun gear.

5. The camshaft drive system according to claim 4, further comprising a cam shaft position sensor for sensing a position of the cam shaft and providing a signal to the controller, wherein the controller adjusts a speed of the motor in order to bring the camshaft into phase with a combustion cycle of the internal combustion engine.

6. A camshaft drive system for an internal combustion engine, comprising:
   a camshaft including a plurality of cam lobes thereon;
   a planetary gear system including a first component drivingly connected to said camshaft;
   a motor drivingly connected to a second component of the planetary gear system; and
   an input device driven by the internal combustion engine and drivingly connected to a third component of the planetary gear system; and
   a controller for controlling operation of the motor for selectively driving the second component at a same speed as the third component and for selectively preventing rotation of the first component of the planetary gear system for preventing rotation of the camshaft
   wherein the input device is a sprocket and the third component of the planetary gear system is a sun gear, the sprocket and sun gear being integrally formed with one another with the sprocket being disposed directly radially outward of the sun gear.

7. The camshaft drive system according to claim 6, wherein the sun gear is rotatably supported on the camshaft.

8. The camshaft drive system according to claim 7, wherein the first component of the planetary gear system is a planetary carrier that includes an axially extending journal and the second component of the planetary gear system is a ring gear which is rotatably supported on the axially extending journal of the planetary carrier.

9. A camshaft drive system for an internal combustion engine, comprising:
   a camshaft including a plurality of cam lobes thereon;
   a planetary gear system including a planetary carrier drivingly connected to said camshaft;
   a motor drivingly connected to a ring gear of the planetary gear system; and
   a sprocket driven by the internal combustion engine and drivingly connected to a sun gear of the planetary gear system;
   a controller for controlling operation of the motor for selectively driving the ring gear at a same speed as the sun gear; and
   a cam shaft position sensor for sensing a position of the cam shaft and providing a signal to the controller, wherein the controller adjusts a speed of the motor in order to bring the camshaft into phase with a combustion cycle of the internal combustion engine.

10. The camshaft drive system according to claim 9, wherein the sprocket and sun gear are integrally formed with one another with the sprocket being disposed directly radially outward of the sun gear.

11. The camshaft drive system according to claim 10, wherein the sun gear is rotatably supported on the camshaft.

12. The camshaft drive system according to claim 11, wherein the planetary carrier includes an axially extending journal and the ring gear is rotatably supported on the axially extending journal of the planetary carrier.

* * * * *